Dec. 20, 1960  J. F. ROESEL, JR  2,965,856
ELECTRICAL INVERTER CIRCUITS
Filed April 7, 1958
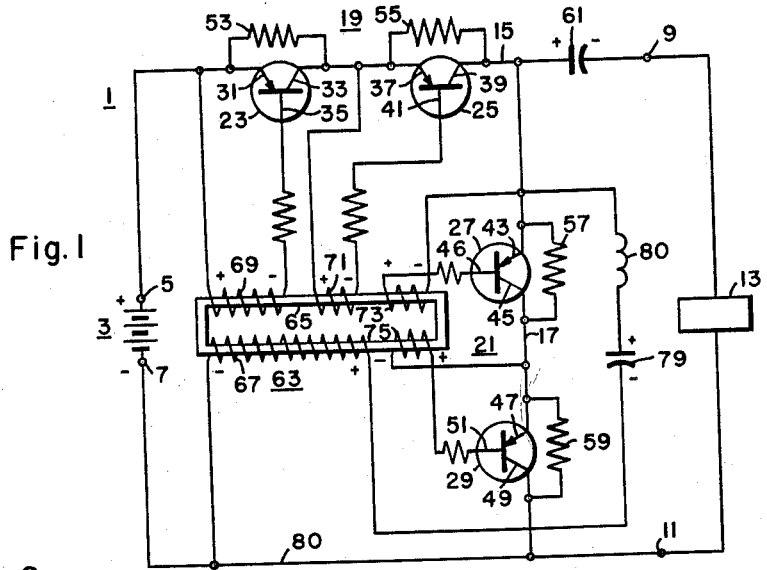
Fig. 1
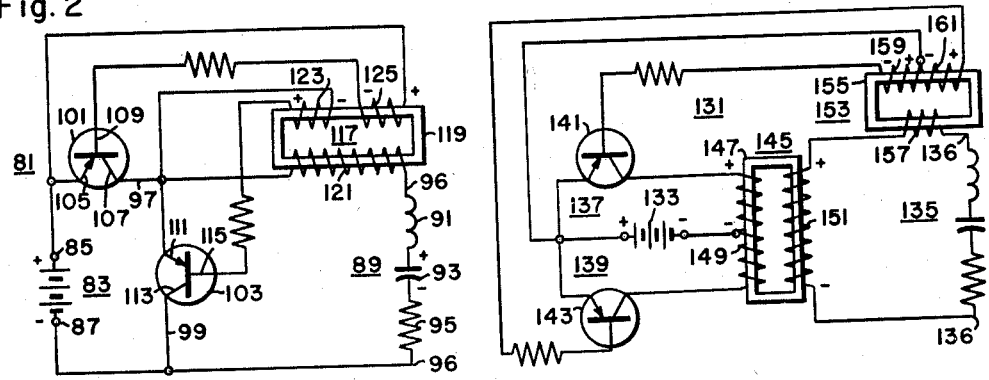
Fig. 2
Fig. 3
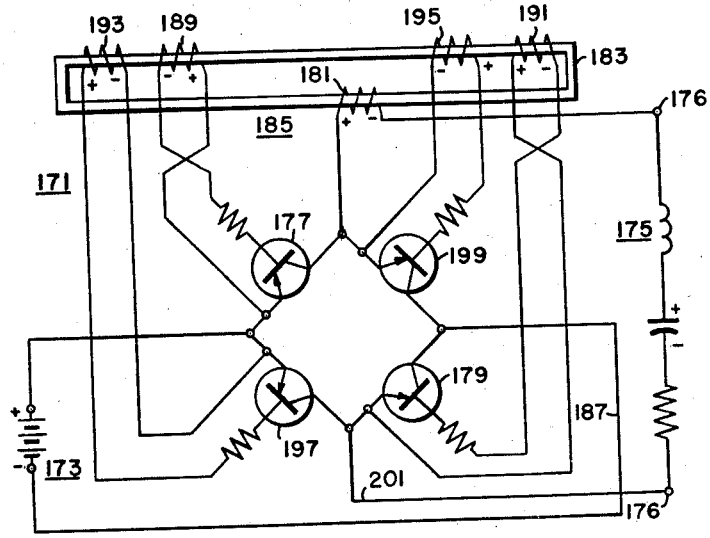
Fig. 4
INVENTOR
John F. Roesel, Jr.
BY
D. M. Schiller
ATTORNEY United States Patent Office 2,965,856
Patented Dec. 20, 1960

2,965,856

ELECTRICAL INVERTER CIRCUITS

John F. Roesel, Jr., Pittsburgh, Pa., assignor to Westinghouse Electric Corporation, East Pittsburgh, Pa., a corporation of Pennsylvania Filed Apr. 7, 1958, Ser. No. 726,934

2 Claims. (Cl. 331—113)

This invention relates to electrical inverter circuits and has particular relation to inverter circuits of the self-excited type.

According to the present invention, an electrical inverter circuit of improved construction is provided for deriving from a direct voltage input an alternating current output. The alternating output may be employed to energize any suitable load device.

According to one aspect of the invention, an inverter circuit is provided wherein one of the load terminals of the circuit is connected directly to a terminal of the direct voltage input. Such an arrangement permits the associated load device to be grounded with respect to the input voltage.

In a preferred embodiment of the invention, an inverter circuit is provided which includes a pair of output or load terminals connected for energization from the direct voltage input through a pair of electrical energizing paths. These energizing paths are connected so that the output terminals are energized in opposing directions through the paths. A separate switch means is included in each of the paths in order to control the connections thereof to the output terminals. Each of the switch means may comprise one or more switching transistors which are effective when in closed and open conditions to provide respectively conductive and non-conductive conditions of the energizing paths.

In order to control operation of the transistor switches, the invention provides electromagnetic means in the form of a switching transformer including a magnetic core having an input winding connected for energization from the direct input voltage. A plurality of biasing windings also link the magnetic core in inductive relation with the input winding to supply bias voltages to the transistors. The direction of energization of the input winding determines the polarities of the bias voltages which in turn determines the operating conditions of the switching transistors.

According to one aspect of the invention, the input winding is connected in parallel relation with the output terminals for energization in a first direction when one of the energizing paths is in a conductive condition and the other path is in a non-conductive condition to maintain said conditions. The input winding is further effective when energized in a second direction opposite to the first direction for a conductive condition of the other path while the one path is in a non-conductive condition to maintain these latter conditions.

In order to periodically reverse the direction of energization of the input winding to thereby reverse the direction of energization of the output terminals, the invention provides control means connected in series relation with the input winding for energization from the direct input voltage. According to one embodiment of the invention, the control means is in the form of a condenser which is periodically charged through the input winding in response to a conductive condition of one of the paths and then discharged through the other path and through the input winding to periodically reverse the direction of energization of the input winding. This condenser may be made adjustable to permit variation of the frequency of energization of the input winding. In a further aspect of the invention, the control means may constitute a series resonant circuit which is effective to reverse the direction of energization of the input winding at the resonant frequency of the resonant circuit. Components of the resonant circuit may be made adjustable to permit variation of the resonant frequency.

An additional condenser is connected in both of the electrical paths for charging from the input voltage through one of the paths and for discharging through the other of the paths. The arrangement is such that the output terminals are energized in one direction during charging of the additional condenser through one of the paths and are energized in the opposite direction by discharge of the additional condenser through the other of the paths.

The present invention further provides that the input winding of the switching transformer is connected in series relation with the output terminals of the circuit. With this arrangement, the load current delivered to the load terminals flows through the input winding with the result that bias voltages are applied to the switching transistors having magnitudes which are proportional to the magnitude of the load current. This arrangement assures that the transistors always have sufficient drive to maintain satisfactory operation of the circuit for any amount of load current.

In the circuits described, energization is supplied to the output terminals in one direction by the input voltage and in the other direction by the discharge of a condenser or by the operation of a resonant circuit. The invention further contemplates a circuit including a control condenser or a control resonant circuit wherein the input voltage supplies energization to the load terminals in each of two opposing directions.

It is, therefore, an object of the present invention to provide an electrical inverter circuit of improved construction for deriving an alternating current output from a direct voltage input.

It is a further object of the invention to provide an inverter circuit for deriving an alternating current output from a direct voltage input with a load device which is grounded with respect to the direct voltage input.

It is still another object of the invention to provide an inverter circuit including a plurality of switching transistors operable to derive from a direct voltage input an alternating output with switch control means energized by the output current to supply switching voltages to the transistors which are proportional to the output current.

It is a still further object of the invention to provide an inverter circuit including a plurality of switching transistors with switch control means including a series resonant circuit operable to effect switching of the transistors with a frequency which is the resonant frequency of the resonant circuit.

It is still another object of the invention to provide an inverter circuit as defined in the preceding paragraph wherein at least a portion of the resonant circuit constitutes a load device energized from the inverter circuit.

Other objects of the invention will become apparent from the following description taken in conjunction with the accompanying drawings, in which:

Figure 1 is a circuit diagram of an inverter circuit constructed in accordance with the present invention;

Fig. 2 is a circuit diagram of an inverter circuit of modified construction from the circuit of Fig. 1;

Fig. 3 is a circuit diagram illustrating an inverter circuit of different construction from the circuits of Figs. 1 and 2; and Fig. 4 is a circuit diagram illustrating an inverter circuit of still different construction from the circuits shown in Figs. 1, 2 and 3.

Referring to the drawings, there is illustrated in Fig. 1 an electrical inverter circuit represented generally by the numeral 1 which is effective to derive from a source of direct input voltage an alternating output current.

As shown in Fig. 1, the circuit 1 includes a source of unidirectional input voltage which may be represented by a conventional battery 3. However, the source 3 may comprise any suitable source of unidirectional voltage. The source 3 is illustrated as having a positive terminal 5 and a negative terminal 7.

The circuit 1 includes further a pair of output or load terminals 9 and 11 to which the alternating current output is supplied. A suitable load device is shown connected across the terminals 9 and 11. The load device is represented by a block 13 and may constitute any alternating current responsive load device.

In order to permit energization of the terminals 9 and 11, the circuit 1 includes a pair of electrical paths 15 and 17. The path 15 includes in series the source 3, switch means 19, the terminals 9 and 11, and the load device 13. The path 17 includes in series the switch means 21, the terminals 9 and 11, and the load device 13. As will presently appear, the switch means 19 and 21 alternately establish and interrupt the paths 15 and 17 to reverse the direction of energization of the terminals 9 and 11. The paths 15 and 17 are connected so that energizing currents are supplied thereby to the terminals 9 and 11 in opposing directions. With this arrangement the alternate establishment and interruption of the two current paths results in the application of an alternating current to the terminals 9 and 11 and to the load device 13.

In the present invention the switch means 19 and 21 each includes one or more switching transistors. The operation of transistors as controlled switch devices is described in detail in Patent No. 2,783,384. In the preferred embodiment illustrated, each of the switch means 19 and 21 comprises a pair of transistors. The switch means 19 includes the transistors 23 and 25, whereas the switch means 21 includes transistors 27 and 29.

Each of the transistors is illustrated in the form of PNP junction transistors, although transistors of the NPN type may also be employed, if desired. The transistor 23 includes an emitter electrode 31, a collector electrode 33 and a base electrode 35. In a similar manner, the transistor 25 includes an emitter 37, a collector 39 and a base 41. It is observed that the emitter and collector electrodes of each of the transistors 23 and 25 are included in the current path 15. In a similar manner, the transistor 27 has an emitter 43, a collector 45 and a base 46, whereas the transistor 29 includes an emitter 47, a collector 49 and a base 51. The emitter and collector electrodes of each of the transistors 27 and 29 are included in the current path 17.

As will presently appear, the provision of two transistors in each current path permits the employment of a source 3 having twice the voltage magnitude than could be utilized if only a single transistor were employed in each of the current paths. It is noted that a separate resistor is connected across the emitter and collector electrodes of each of the transistors. As shown in Fig. 1, resistors 53, 55, 57 and 59 are connected across the emitter and collector electrodes, respectively, of the transistors 23, 25, 27 and 29. These resistors are effective to assure an even distribution of the voltage of the source 3 across the emitter and collector electrodes of the transistors when such transistors are in a blocking condition.

When the path 15 is in an established condition produced by a closed condition of the switch means 19, current from the source 3 flows from the terminal 5 through the switch means 19, the terminal 9, load device 13 and the terminal 11 back to the terminal 7 of the source 3. Consequently, the terminals 9 and 11 and the load device are energized in one direction when the path 15 is established. As will appear hereinafter, the path 17 is interrupted during the time that the path 15 is established.

In order to permit energization of the terminals 9 and 11 in a direction opposite to the direction of energization produced by establishment of the path 15, the invention provides suitable energizing means arranged to energize the terminals 9 and 11 in such opposite direction when the path 17 is established. For this purpose, a suitable condenser 61 is connected in both of the paths 15 and 17 for energization from the source 3 through the path 15 when that path is in an established condition. Such energization results in charging of the condenser 61. Subsequent to such charging, the path 15 is interrupted and the path 17 is established whereupon the condenser 61 will discharge through the switch means 21, the terminal 11, the load device 13 and the terminal 9.

In order to control the switching of the switch means 19 and 21 to thereby control the conditions of the paths 15 and 17 and the direction of energization of the terminals 9 and 11, the invention provides switch control means shown in the form of a switching transformer represented generally by the numeral 63. The transformer 63 includes a magnetic core 65 which may be constructed of any suitable magnetic material. The core 65 is designed so as not to saturate during operation of the circuit 1.

In order to control magnetization of the core 65, the transformer includes an input winding 67 which is connected to be energized by currents derived from the source 3. In the embodiment illustrated in Fig. 1, the winding 67 is connected in parallel relation with the switch means 21 and with the terminals 9 and 11 for energization in one direction through the switch means 19 when such switch means is in a closed condition, and for energization in the opposite direction through the switch means 21 when such switch means is in a closed condition.

In order to supply bias voltages to the several transistors, the transformer 63 includes secondary windings 69, 71, 73 and 75 which are associated respectively with the transistors 23, 25, 27 and 29. In Fig. 1, each of the secondary windings is shown connected between the emitter and base electrodes of the associated transistor. As is understood in the art, the polarity of the bias voltage applied between the emitter and base electrodes of a transistor determines the conductive condition of the transistor. As an example, when the emitter electrode of a transistor of the PNP type is rendered positive with respect to the base electrode, the transistor exhibits a very low impedance between its emitter and collector electrodes and may be said to be in a closed switching condition. When the applied voltage is such that the base electrode is positive with respect to the emitter electrode, the transistor may be said to be in an open switching condition inasmuch as a very high impedance is established between the emitter and collector electrodes. If the polarity of the biasing voltage is made to periodically reverse, the condition of the transistor switch will also reverse between open and closed.

In order to effect periodic reversal of the polarity of the bias voltages applied to the several transistors, control means are provided for periodically reversing the direction of energization of the input winding 67. As illustrated in Fig. 1, such control means comprises a condenser 79 connected in series relation with the input winding 67. If desired, the control means may comprise a series resonant circuit in series with the winding 67 including an inductance 80 and the condenser 79.

When the condenser 79 alone is employed, the periodic charging and discharging thereof is effective to reverse the direction of energization of the winding 67 at a frequency determined by the time constant of the charging circuit for the condenser 79. This action effects reversals of the polarities of the bias voltages applied to the transistors also at such frequency. The resulting alternating current supplied to the terminals 9 and 11 possesses a frequency which is dependent upon the time constants of the circuits through which the condensers 61 and 79 are charged. These time constants preferably have substantially equal values.

The operation of the circuit 1 will now be described for the case when the condenser 79 alone is employed. When the source 3 is connected in the circuit 1, it is observed that the transistors of the switch means 19 will assume a conducting condition. When this occurs, current from the source 3 will flow from the terminal 5 through the emitter and collector electrodes of the transistors 23 and 25, the condenser 61, the terminal 9, the load device 13 and the terminal 11 back to the negative terminal 7. Current from the source 3 also flows through an additional path which may be traced from the terminal 5 through the emitter and collector electrodes of the transistors 23 and 25 through the condenser 79 and the winding 67 back to the terminal 7. With the connections illustrated, energization of the winding 67, as described, results in the application of bias voltages to the several transistors having polarities as indicated by the associated plus and minus signs. The polarities of these voltages are such that the transistors 23 and 25 are maintained in conductive conditions and the transistors 27 and 29 are maintained in non-conductive conditions.

During the time that the transistors 23 and 25 are in conductive conditions to thereby establish the path 15, the condensers 61 and 79 are being charged and the load device 13 is being energized. At some later time determined by the time constant of the circuit through which the condenser 79 is charged, the condenser 79 will be substantially fully charged with the result that current traversing the input winding 67 is substantially a zero value. This action results in the production of bias voltages having substantially zero values. As a result of this, the transistors 23 and 25 begin to assume non-conductive conditions with the result that the voltages across their emitter and collector electrodes begin to increase.

As these voltages increase and the voltage applied to condenser 79 from the source 3 becomes less than the voltage across the condenser 79, the condenser 79 begins to discharge through the transistors 27 and 29 and through the winding 67 to energize the winding 67 in a direction which is opposite to the direction of energization thereof during conductive conditions of the transistors 23 and 25. Such opposite direction of energization of the winding 67 results in the establishment of bias voltages having polarities opposite to those illustrated. These bias voltages are effective to render the transistors 23 and 25 completely non-conductive and at the same time to establish fully conductive conditions of the transistors 27 and 29. When this occurs, the charged condenser 61 discharges through the path 17 including the transistors 27 and 29, the terminals 9 and 11 and the load device 13. This discharge current is in such a direction as to energize the terminals 9 and 11 and the load device 13 in a direction which is opposite to the previously described direction of energization of the terminals 9 and 11 and the load device 13.

At some later time the discharge current from the condenser 79 is substantially zero, resulting in the production of bias voltages having substantially zero values. This results in the transfer of the transistors 27 and 29 toward non-conductive conditions. When this occurs, current from the source 3 begins to flow through the transistors 23 and 25, the condenser 61, the terminal 9, the load device 13, and terminal 11 back to the source 3. Current also again begins to flow from the source 3 through the transistors 23, 25, condenser 79 and the winding 67 back to the source 3. This direction of current flow through the winding 67 establishes bias voltages having the polarities as illustrated in Fig. 1 to thereby effect conductive conditions of the transistors 23 and 25 and non-conductive conditions of the transistors 27 and 29. The cycle of events above described then repeats itself continuously. As a result of this action, an alternating current appears at the terminals 9 and 11 to energize the load device 13.

As previously stated, the frequency of this alternating current is determined by the time constants of the charging circuits for the condensers 61 and 79. These time constants are preferably made equal to approximately the period of one half cycle of the frequency of the alternating output. If the inductance 80 is also employed, the frequency will be the resonant frequency of the resonant circuit formed by the components 79 and 80.

It is noted that the terminal 11 is connected directly to the terminal 7 of the source 3 through a conductor 80 thereby effecting a ground connection of the load device 13 relative to the source 3. This is a very advantageous arrangement in that the necessity of providing an output transformer for isolation purposes is eliminated.

With the circuit of Fig. 1 it has been observed that very small voltages are applied across the transistors 23 and 25 and across the transistors 27 and 29 at the times these transistors are transferring from conductive to non-conductive conditions. This arrangement provides very desirable performance characteristics of the circuit.

Referring now to Fig. 2, there is illustrated an inverter circuit of different construction than the circuit 1 of Fig. 1. In Fig. 2, an inverter circuit is shown wherein the input winding of the switching transformer is connected for energization by the load current flowing to the load terminals. Also, in Fig. 2, a controlling resonant circuit or condenser is connected in series with the input winding to constitute a portion of the load device. If desired, the condenser or resonant circuit may be connected in series with the load device to be independent of the load device.

As illustrated in Fig. 2, a circuit 81 is provided including a direct voltage source 83 having respectively positive and negative terminals 85 and 87. The load device is represented generally by the numeral 89 and includes an inductance 91, a condenser 93 and a resistor 95. The load device 89 is connected across terminals 96.

As in Fig. 1, a pair of current paths are provided to effect energization of the load device 89 in opposing directions. As illustrated, current paths 97 and 99 are provided with the path 97 including the source 83, a switching transistor 101, and the load device 89. The path 99 includes a switching transistor 103 and the load device 89.

The switching transistors 101 and 103 are provided for the purpose of controlling the establishment and interruption of the current paths 97 and 99. For this purpose, the transistor 101 includes an emitter electrode 105, a collector electrode 107 and a base electrode 109 with the emitter and collector electrodes connected in the path 97. In a similar manner, the transistor 103 includes an emitter electrode 111, a collector electrode 113 and a base electrode 115 with the emitter and collector electrodes connected in the path 99.

The switching conditions of the transistors are controlled by means of a switching transformer 117 including, as in Fig. 1, a magnetic core 119 which may be constructed of any suitable magnetic material. The transformer 117 includes further an input winding 121 which is observed to be connected in each of the paths 97 and 99 in series relation with the load device 89. The transformer 117 includes also secondary windings 123 and 125 which are connected respectively between the base and emitter electrodes of the transistors 103 and 101. The secondary windings establish bias voltages for the transistors in a manner identical to the corresponding secondary windings of Fig. 1.

In operation, when the source 83 is connected in the circuit 81 the transistor 101 will assume a conductive condition. When this occurs, current flows from the source 83 through the emitter and collector electrodes of the transistor 101, the winding 121 and the load device 89 back to the source 3. Such current flow results in a direction of energization of the winding 121 which is effective to establish bias voltages across the secondary windings 123 and 125 having the polarities illustrated. These bias voltages are effective to maintain the transistor 101 in a conductive condition and to maintain the transistor 103 in a non-conductive condition.

These conditions prevail until the condenser 93 becomes charged at which time current through the winding 121 is at a zero value. When this occurs, the transistor 101 begins to assume a non-conductive condition. This causes the condenser 93 to discharge through the path 99 which may be traced from the condenser through the inductance 91, the winding 121, and the emitter and collector electrodes of the transistor 103 back to the condenser 93. The direction of energization of the winding 121 is now reversed from the previous direction with the result that bias voltages of polarity opposite to those shown are induced in the secondary windings. These bias voltages cause the transistor 103 to assume a conductive condition and the transistor 101 to assume a non-conductive condition.

When the discharge current from the condenser 93 is reduced to a zero value, substantially zero bias voltages are induced in the secondary windings with the result that the transistor 103 begins to transfer to a non-conductive condition. At this time current from the source 83 begins to traverse the path 97 as initially described. The described cycle of events then repeats itself with the result that the load 89 is energized by an alternating current having a frequency which is substantially the resonant frequency of the resonant circuit when such is employed, or which is determined by the time constant of the condenser charging circuit when only the condenser is utilized.

It is observed that the winding 121 is energized by the current which is delivered to the load device 89. As a result of this, the magnitudes of the bias voltages induced in the secondary windings 123 and 125 are proportional to the load current. This assures that sufficient bias voltage is applied to the transistors under all magnitudes of load current. Preferably, the ratio of the turns of winding 121 to the turns of each of the windings 123 and 125 is made slightly less than the minimum switching current gain of the transistors. It is also observed that the load device 89 is effectively connected to ground with respect to the source 83 in the manner of the circuit of Fig. 1.

In Fig. 3 there is illustrated an inverter circuit 131 of different construction than the circuits of Figs. 1 and 2. It will be recalled that in the circuits of Figs. 1 and 2 the direct voltage source supplies energization only on alternate half cycles to the load device. In Fig. 3, the arrangement is such that the direct voltage source supplies energization to the load device continuously rather than during only alternate half cycles. In Fig. 3, the circuit 131 is shown as including a direct voltage source 133 and a load device 135 which may include series-connected inductance, condenser and resistance elements providing a resonant circuit. If desired, the resonant circuit may be independent of the load device. The load device is connected across terminals 136. A pair of current paths 137 and 139 are connected to the source 133 for supplying energization to a transformer as will be described hereinafter.

The paths 137 and 139 include respectively switching transistors 141 and 143. These paths are associated with a transformer 145 including a magnetic core 147 having a primary winding 149 surrounding the core. The arrangement is such that the paths 137 and 139 supply current from the source 133 in opposing directions to the winding 149. The transformer 145 includes further a secondary winding 151 which supplies energization to a switching transformer 153 and to the load device 135.

The transformer 153 includes a magnetic core 155 having an input winding 157 which is connected in series with the winding 151 and the load device 135. In order to control operation of the transistor switches, the transformer 153 includes secondary windings 159 and 161 connected respectively between the emitter and base electrodes of the transistors 141 and 143. A center-tapped secondary winding may be used for this purpose, if desired.

The operation of the circuit 131 is similar to operation of the circuit 81 of Fig. 2. When the source 133 is connected in the circuit 131, it may be assumed that the transistor 141 begins to conduct to thereby energize the upper half of the winding 149, as viewed in Fig. 3. This results in the induction of voltage in the winding 151 having the polarity illustrated. This voltage causes a current to flow through the input winding 157 and the load device 135. The direction of energization of the winding 157 is such that bias voltages are induced in the secondary windings 159 and 161 having polarities as illustrated which maintain conduction of transistor 141 and render transistor 143 non-conductive.

When the condenser charges, current through the winding 157 is reduced to zero with the result that transistor 141 assumes a non-conductive condition. When this occurs, the condenser discharges through the winding 157 to establish bias voltages which transfer the transistor 143 to a conductive condition and the transistor 141 to a non-conductive condition. Current then flows from the source 133 through transistor 143 and through the lower section of the winding 149 to induce a voltage in the winding 151 having a polarity opposite to that shown. This voltage causes current to flow through the winding 157 effective to establish bias voltages which maintain conduction of transistor 143 and non-conduction of transistor 141. This current eventually falls to a zero value as the condenser becomes charged to transfer the transistor 143 to a non-conductive condition. This causes the condenser to discharge through the winding 157 in such a direction as to transfer the transistor 141 to a conductive condition and the transistor 143 to a non-conductive condition. This cycle of events then repeats itself at the resonant frequency of the resonant circuit if one is employed, or at a frequency determined by the time constant of the condenser charging circuit if a condenser is utilized.

In Fig. 4 there is illustrated a circuit 171 which differs from the preceding circuits in that a bridge connection of four transistors is utilized. The circuit 171 of Fig. 4 is similar to the circuit of Fig. 3 in that the source 173 supplies energization to the load 175 continuously rather than on alternate half cycles. The load 175 may include series-connected inductance, condenser and resistance elements to form a resonant circuit. If desired, the resonant circuit may be independent of the load. The load is connected across terminals 176.

In operation, if the transistors 177 and 179 are assumed to be initially in conductive conditions, the current flows from the source 173 through transistor 177, winding 181 on core 183 of transformer 185, load device 175, transistor 179 and back to source 173 through the conductor 187. Winding 181 is thereby energized in a direction to establish bias voltages across windings 189 and 191 having the polarities illustrated to maintain conduction of transistors 177 and 179. Such direction of energization also establishes voltages across windings 193 and 195 having polarities as illustrated to maintain non-conductive conditions of transistors 197 and 199.

At a later time determined by the resonant frequency of the resonant load circuit, the condenser becomes charged with the result that current through the winding 181 is reduced to zero, thereby causing a similar reduction to zero of the bias voltages which transfers the transistors 177 and 179 toward non-conductive conditions. When this occurs the condenser discharges through winding 181, transistor 199, conductor 187, source 173, transistor 197 and conductor 201. This discharge current energizes winding 181 in a direction effective to establish conductive conditions of transistors 197 and 199, and non-conductive conditions of transistors 177 and 179.

When transistors 177 and 179 are transferred to non-conductive conditions, current from the source 173 then flows through transistor 197, conductor 201, load device 175, winding 181, transistor 199, and conductor 187 back to the source 173. Such current flow energizes winding 181 in a direction to maintain conductive conditions of transistors 197 and 199, and non-conductive conditions of transistors 177 and 179. When the condenser is eventually charged, transistors 197 and 199 begin to assume non-conductive conditions. The condenser thus discharges through transistors 177 and 179 to energize winding 181 in a direction permitting current from the source 173 to flow through the conductive transistors.

This then completes one full cycle of operation of the circuit. This action then continues with the result that load device 175 is energized by an alternating current having a frequency which is substantially the resonant frequency of the resonant circuit, or which is determined by the condenser charging circuit if a condenser alone is employed.

Although the invention has been described with reference to certain specific embodiments thereof, numerous modifications are possible, and it is desired to cover all modifications falling within the spirit and scope of the invention.

I claim as my invention:

1. In an electrical system, a source of unidirectional voltage, a pair of terminals, a pair of electrical paths connected to supply energizing currents derived from said source to said terminals in opposing directions, switch means included in each of said paths, each of said switch means being operable to transfer the associated path between a conductive condition and a non-conductive condition, switch operating means including electromagnetic means for controlling operation of said switch means, said electromagnetic means having input winding means connected for energization by currents derived from said source, said input winding means being connected for energization in a first direction during a conductive condition of one of said paths while the other of said paths is in a non-conductive condition, said input winding means being further connected for energization in a second direction opposite to said first direction during a conductive condition of said other of said paths while said one of said paths is in a non-conductive condition, said input winding means being effective when energized in said first direction to operate said switch means for maintaining said first-named conditions, and when energized in said second direction to operate said switch means for maintaining said last-named conditions, and control means for controlling energization of said input winding means, said control means comprising a condenser connected in series relation with said input winding means for energization from said source through one of said paths, said condenser being effective to reverse the direction of energization of said input winding means in response to discharge thereof through a portion of the other of said paths, and a second condenser connected in both of said paths for energization from said source through said one of said paths, said second condenser being effective to reverse the direction of energization of said terminals in response to discharge thereof through said other of said paths.

2. In an electrical system, a source of direct voltage, a pair of terminals, a pair of electrical paths connected to supply energizing currents derived from said source to said terminals in opposing directions, a pair of transistor devices each having emitter, collector and base electrodes, the emitter and collector electrodes of each of said devices being included in a separate one of said paths, each of said devices being operable to transfer the associated path between a conductive condition and a non-conductive condition, a magnetic core, an input winding linking the core for energization by currents derived from said source, said input winding being connected for energization in a first direction during a conductive condition of one of said paths while the other of said paths is in a non-conductive condition, and for energization in a second direction opposite to said first direction during a conductive condition of said other path while said one path is in a non-conductive condition, a pair of biasing windings linking the core in inductive relation with said input winding, each of said biasing windings being connected between one electrode of the emitter and collector electrodes and the base electrode of a separate one of said devices, said biasing windings being connected to apply voltages induced therein by energization of said input winding in said first direction to operate said devices for establishing a conductive condition of said one path and a non-conductive condition of said other path, and to apply voltages induced therein by energization of said input winding in said second direction to operate said devices for establishing a conductive condition of said other path and a non-conductive condition of said one path, and control means for periodically reversing the direction of energization of said input winding, said control means comprising a condenser connected in series relation with said input winding means for energization from said source through one of said paths, said condenser being effective to reverse the direction of energization of said input winding means in response to discharge thereof through a portion of the other of said paths, and a second condenser connected in both of said paths for energization from said source through said one of said paths, said second condenser being effective to reverse the direction of energization of said terminals in response to discharge thereof through said other of said paths.

References Cited in the file of this patent
UNITED STATES PATENTS

| | | |
|---|---|---|
| 2,147,474 | Wagner et al. | Feb. 14, 1939 |
| 2,748,274 | Pearlman | May 29, 1956 |
| 2,827,568 | Altschul | Mar. 18, 1958 |
| 2,843,815 | Driver | July 15, 1958 |
| 2,846,581 | Volkers | Aug. 5, 1958 |